(12) United States Patent
Naber et al.

(10) Patent No.: US 7,681,419 B2
(45) Date of Patent: Mar. 23, 2010

(54) DRY CLEANING SOLVENT FILTER

(75) Inventors: Christopher Nils Naber, Louisville, KY (US); Craig Vitan, Louisville, KY (US); Venkataraman Rachakonda, Farmington, MI (US); Darren Hallman, Scotia, NY (US)

(73) Assignee: General Electric Company, Schenectady, NY (US)

( * ) Notice: Subject to any disclaimer, the term of this patent is extended or adjusted under 35 U.S.C. 154(b) by 757 days.

(21) Appl. No.: 11/262,680

(22) Filed: Oct. 31, 2005

(65) Prior Publication Data

US 2007/0095110 A1    May 3, 2007

(51) Int. Cl.
*D06F 39/10* (2006.01)

(52) U.S. Cl. .......................... 68/18 F; 68/184

(58) Field of Classification Search ............ 68/18 F, 68/18 R; 134/184, 198
See application file for complete search history.

(56) References Cited

U.S. PATENT DOCUMENTS

| | | | | | |
|---|---|---|---|---|---|
| 950,574 | A | * | 3/1910 | Morgan ...................... | 4/292 |
| 1,956,589 | A | * | 5/1934 | Perry ........................... | 8/137 |
| 1,982,924 | A | * | 12/1934 | Norquist ..................... | 210/486 |
| 1,993,407 | A | * | 3/1935 | Hetzer ......................... | 159/1.1 |
| 2,039,963 | A | * | 5/1936 | Jones .......................... | 196/106 |
| 2,041,711 | A | * | 5/1936 | Hetzer ........................ | 68/18 R |
| 2,055,679 | A | * | 9/1936 | Boerner ...................... | 210/367 |
| 2,114,776 | A | * | 4/1938 | Davis ......................... | 68/18 R |
| 2,165,884 | A | * | 7/1939 | Chamberlin et al. ......... | 8/159 |
| 2,201,790 | A | * | 5/1940 | Rouch ........................ | 68/208 |
| 2,303,541 | A | * | 12/1942 | Gluckman ................. | 68/12.08 |
| 2,310,680 | A | * | 2/1943 | Dinley ........................ | 34/74 |
| 2,360,278 | A | * | 10/1944 | Robertson .................. | 68/18 F |
| 2,367,794 | A | * | 1/1945 | Marselus .................... | 210/479 |
| 2,413,954 | A | * | 1/1947 | Conterman ................. | 210/451 |
| 2,690,232 | A | * | 9/1954 | Brem ......................... | 210/450 |
| 2,705,221 | A | * | 3/1955 | Clark et al. ................. | 204/662 |
| 2,964,851 | A | * | 12/1960 | Stelljes et al. ............... | 34/82 |
| 2,987,902 | A | * | 6/1961 | Mack .......................... | 68/4 |
| 3,073,452 | A | * | 1/1963 | Gayring ..................... | 210/108 |
| 3,103,112 | A | * | 9/1963 | Behrens et al. ............. | 68/18 R |
| 3,133,286 | A | * | 5/1964 | Brucken et al. ............ | 68/18 F |

(Continued)

FOREIGN PATENT DOCUMENTS

DE    100 65 344    *    7/2002

(Continued)

OTHER PUBLICATIONS

European Patent Office 0 362 738 Apr. 1990.*

(Continued)

*Primary Examiner*—Frankie L Stinson
(74) *Attorney, Agent, or Firm*—George L. Rideout, Esq.; Armstrong Teasdale LLP

(57) ABSTRACT

A dry cleaning machine includes a tub for holding articles to be cleaned. A door is rotatably coupled to the dry cleaning machine. The door is movable from a closed position wherein access to the tub is substantially sealed, to an open position providing access to the tub. An outlet tube is coupled in flow communication to the tub. A filter assembly is positioned between the tub and the outlet tube filtering dry cleaning fluid channeled towards the outlet tube.

18 Claims, 3 Drawing Sheets

U.S. PATENT DOCUMENTS

| | | | | | |
|---|---|---|---|---|---|
| 3,156,647 | A | * | 11/1964 | Gould | 210/209 |
| 3,199,678 | A | * | 8/1965 | Willinger | 210/167.25 |
| 3,240,345 | A | * | 3/1966 | Butler et al. | 210/435 |
| 3,382,985 | A | * | 5/1968 | Muehl | 210/495 |
| 3,402,576 | A | * | 9/1968 | Krupsky | 68/4 |
| 3,407,633 | A | * | 10/1968 | Giambertoni | 68/18 F |
| 3,426,446 | A | * | 2/1969 | Lotzsch | 34/77 |
| 3,727,763 | A | * | 4/1973 | Arenskov | 210/163 |
| 3,771,334 | A | | 11/1973 | Quackenbush | |
| 3,772,902 | A | * | 11/1973 | Noguchi | 68/18 F |
| 3,788,484 | A | * | 1/1974 | Godin | 210/447 |
| 3,977,218 | A | * | 8/1976 | Zucchini | 68/18 R |
| 4,049,555 | A | * | 9/1977 | Matherne | 210/409 |
| 4,091,643 | A | * | 5/1978 | Zucchini | 68/18 C |
| 4,125,003 | A | * | 11/1978 | Wasemann | 68/208 |
| 4,133,769 | A | * | 1/1979 | Morgan, Jr. | 210/455 |
| 4,266,412 | A | | 5/1981 | Merenda | |
| 4,376,053 | A | * | 3/1983 | Bullock et al. | 210/767 |
| 4,513,590 | A | | 4/1985 | Fine | |
| 4,689,896 | A | * | 9/1987 | Narang | 34/82 |
| 4,769,921 | A | | 9/1988 | Kabakov et al. | |
| 4,793,938 | A | | 12/1988 | Dayton | |
| 4,813,247 | A | * | 3/1989 | Takeda | 68/18 C |
| 4,885,099 | A | | 12/1989 | Kelly | |
| 4,954,222 | A | | 9/1990 | Durr et al. | |
| 5,047,123 | A | * | 9/1991 | Arvanitakis | 202/170 |
| 5,069,755 | A | | 12/1991 | Durr et al. | |
| 5,178,773 | A | * | 1/1993 | Kerlin et al. | 210/724 |
| 5,290,344 | A | | 3/1994 | Onodera | |
| 5,326,471 | A | * | 7/1994 | Pietzsch | 210/402 |
| 5,457,270 | A | | 10/1995 | Hildebrand et al. | |
| 5,565,097 | A | * | 10/1996 | Hayday | 210/167.31 |
| 5,662,797 | A | * | 9/1997 | Varrassi | 210/232 |
| 5,702,592 | A | * | 12/1997 | Suri et al. | 210/90 |
| 5,770,074 | A | * | 6/1998 | Pugh | 210/474 |
| 5,862,535 | A | * | 1/1999 | Noga et al. | 4/286 |
| 6,033,455 | A | * | 3/2000 | Kurashima | 55/497 |
| 6,237,373 | B1 | * | 5/2001 | Harris et al. | 68/18 F |
| 7,179,377 | B1 | * | 2/2007 | Caughman, Jr. | 210/232 |
| 7,275,400 | B2 | * | 10/2007 | Severns et al. | 68/18 F |
| 7,325,694 | B2 | * | 2/2008 | Bushey | 210/499 |

FOREIGN PATENT DOCUMENTS

| | | | |
|---|---|---|---|
| FR | 2 524 023 | * | 9/1983 |
| JP | 59-146699 | * | 8/1984 |
| JP | 11-090113 | * | 4/1999 |
| JP | 2005-171516 | * | 6/2005 |

OTHER PUBLICATIONS

WIPO WO 94/25661 Nov. 1994.*
European Patent Office 0 504 000 Sep. 1992.*
European Patent Office 0 752 493 Jan. 2997.*

* cited by examiner

DRY CLEANING SOLVENT FILTER

BACKGROUND OF THE INVENTION

This invention relates generally to dry cleaning machines, and more particularly, to a filter used for removing contaminants from dry cleaning fluid used in dry cleaning machines.

At least some known dry cleaning machines include a cabinet that houses an outer tub that contains a quantity of dry cleaning fluid, a perforated clothes basket, and a storage tank for storing the dry cleaning fluid. A drive and motor assembly is used to rotate the basket within the tub. Generally, known dry cleaning machines execute a cleaning cycle followed by a spin cycle and a drying cycle.

In at least one known dry cleaning machine, during the cleaning cycle, the clothes are saturated with dry cleaning fluid and then tumbled in an amount of dry cleaning fluid. Specifically, the dry cleaning fluid dissolves certain fluid soluble soils, and the tumbling facilitates dislodging some insoluble soils and increasing the effectiveness of the cleaning process. Because of the cost of the dry cleaning fluid, the fluid is not discarded, but rather, the dry cleaning fluid is filtered, in one or more stages, to remove objects dislodged from the clothed such as buttons, etc., and particulates such as lint. The filtered fluid is then cleaned, also in one or more stages, and returned to the storage tank for reuse.

Generally, known dry cleaning machines are sealed during operation to inhibit the emission of dry cleaning fluid vapors, into the home. After the cleaning cycle and spin cycle, liquid cleaning fluid is drained from the tub. In the drying cycle, cleaning fluid remaining in the clothes is evaporated, condensed to liquid, and returned to the storage tank. To facilitate the recapture of evaporated fluid, air is not exhausted from the dry cleaning machine during the drying cycle.

While dry cleaning machines give consumers the ability to clean some fabrics which can not be washed in water, known dry cleaning machines also have certain detriments. For example, the dry cleaning system must be sealed during operation to prevent the release of potentially harmful vapors into the home and further, the cleaning and recapture of the dry cleaning fluid places additional demands on the dry cleaning system. Sealing systems used with dry cleaning machines can be costly to maintain. Moreover, known filters often require frequent cleaning and/or replacement to facilitate sufficient operation of the dry cleaning machines.

BRIEF DESCRIPTION OF THE INVENTION

In one aspect, a dry cleaning machine is provided. The dry cleaning machine includes a tub for holding articles to be cleaned. A door is rotatably coupled to the dry cleaning machine. The door is movable from a closed position wherein access to the tub is substantially sealed, to an open position providing access to the tub. An outlet tube is coupled in flow communication to the tub. A filter assembly is positioned between the tub and the outlet tube filtering dry cleaning fluid channeled towards the outlet tube.

In another aspect, a dry cleaning solvent filter assembly for a dry cleaning machine is provided. The filter assembly includes a handle, a filter element, and a connecting portion joining the handle and the filter element.

DETAILED DESCRIPTION OF THE INVENTION

Figure 1:
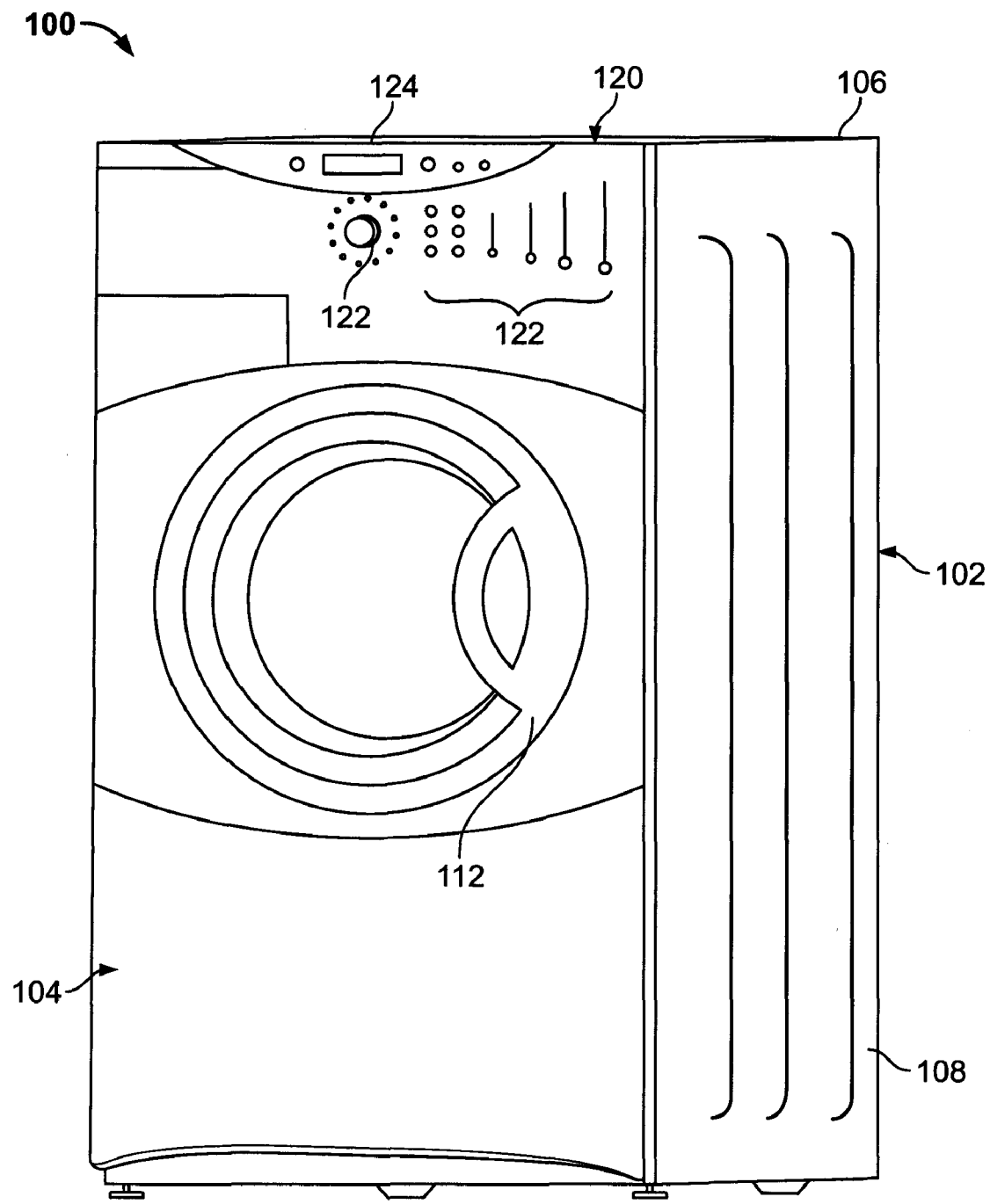
FIG. 1 is a perspective view of an exemplary dry cleaning machine.

FIG. 1 is a perspective view of an exemplary dry cleaning machine 100. Dry cleaning machine 100 includes a cabinet 102 having a front panel 104, a top panel 106, and side panels 108. A door 112 is mounted to the front panel 104 and is rotatable about a hinge (not shown) between an open position (not shown) and a closed position (shown in FIG. 1). Rotation to the open position enables access to a basket (not shown) positioned in the interior of dry cleaning machine 100 and used to hold a clothes load. Rotation to the closed position facilitates forming a substantially sealed enclosure over the basket. A control panel 120 including a plurality of input selectors 122 is coupled to an upper portion of front panel 104. Control panel 120 and input selectors 122 collectively form a user interface for operator selection of machine cycles and features, and, in one embodiment, a display section 124 indicates selected features, machine status, and other items of interest to users. As illustrated in FIG. 1, dry cleaning machine 100 is a horizontal axis dry cleaning machine. It is contemplated that the benefits of the invention accrue to other types of dry cleaning machines, including, but not limited to, vertical axis machines.

Figure 2:
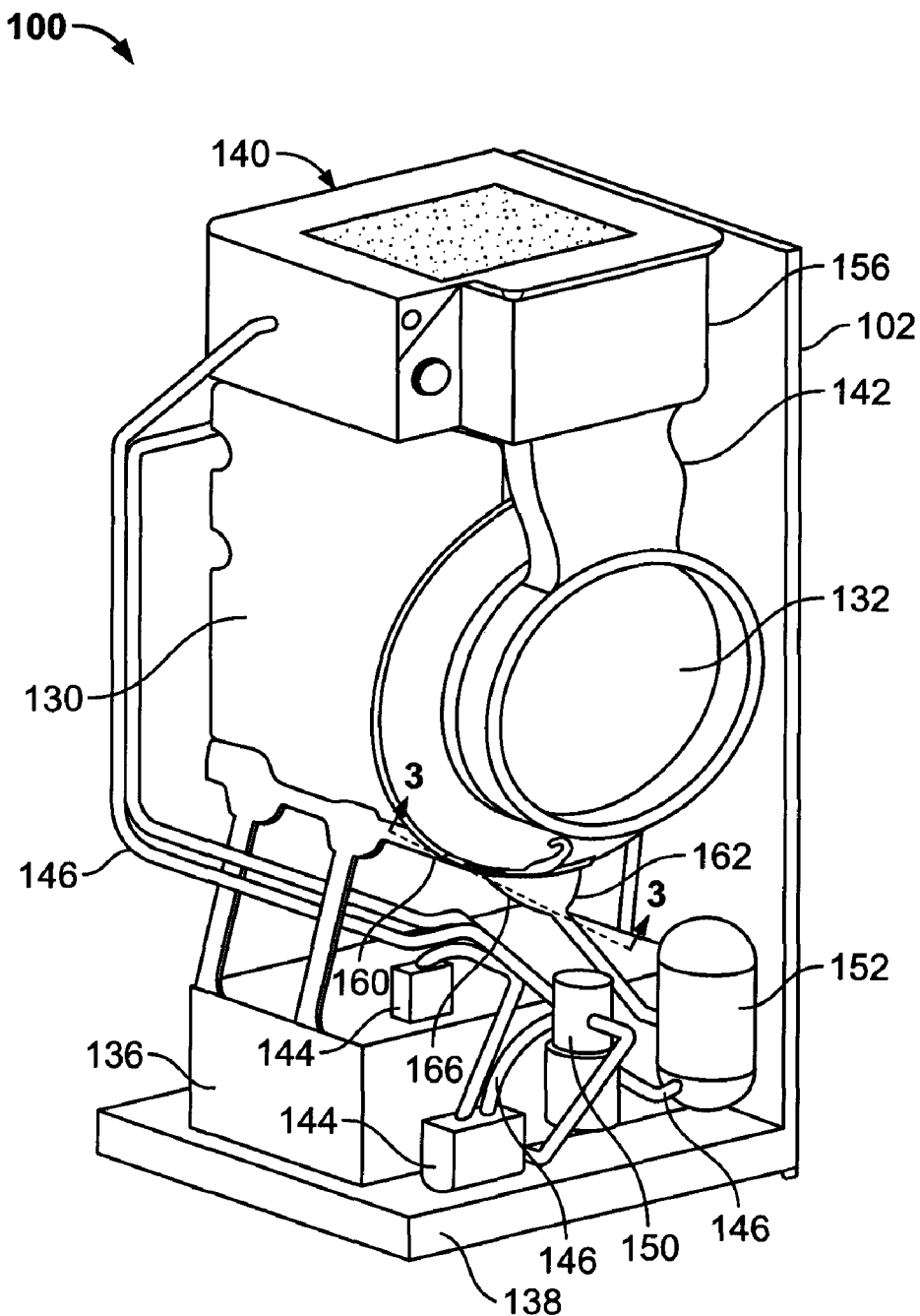
FIG. 2 is a perspective view of the dry cleaning machine shown in FIG. 1 with the cabinet partially removed.

FIG. 2 is a perspective cutaway view of dry cleaning machine 100 with the cabinet 102 partially removed. Dry cleaning machine 100 includes a tub 130 having an opening 132 formed therein which provides access to the clothes basket (not shown). The basket is rotatably coupled within tub 130. A storage tank 136 for storing a quantity of dry cleaning fluid is positioned on a cabinet base platform 138 beneath tub 130. Dry cleaning fluid is returned to tank 136 for reuse after clothes are cleaned. A fluid recovery system 140 coupled above tub 130 facilities recovering evaporated dry cleaning fluid during the drying cycle. A return duct 142 returns filtered air from fluid recovery system 140 to tub 130. A plurality of pumps 144 channel dry cleaning fluid from storage tank 136 to various components of the dry cleaning machine, including tub 130, as well as channeling spent cleaning fluid to storage tank 136 for reuse. A plurality of fluid lines 146 extend between pumps 144, storage tank 136, tub 130, fluid recovery system 140 and between a water separator 150 and a canister filter 152. Tub 130 includes a drain channel 160 that channels fluid to an outlet tube 162. A filter assembly 166 is positioned between drain channel 160 and outlet tube 162. Filter assembly 166 facilities removing particles from spent dry cleaning fluid without causing a pressure drop that may adversely impact the drain time of tub 130 or the operation of machine 100.

Water separator 150 facilities removing water from the dry cleaning fluid. Water is not normally used in the dry cleaning process, but may be present depending on the humidity of the air or the dampness of garments in the clothes load. Canister filter 152 is a component of a multi-stage filtration process, the first stage of which occurs within filter assembly 166. In one embodiment, outlet tube 162 is in flow communication with canister filter 152.

Operation of dry cleaning machine 100 is controlled by a main controller 156. Controller 156 is operatively coupled to the user interface input on front panel 104 (FIG. 1) to enable a user to select dry cleaning machine cycles and features. In response to user manipulation, main controller 156 controls various components of dry cleaning machine 100 to cause selected machine cycles and features to be executed.

Figure 3:
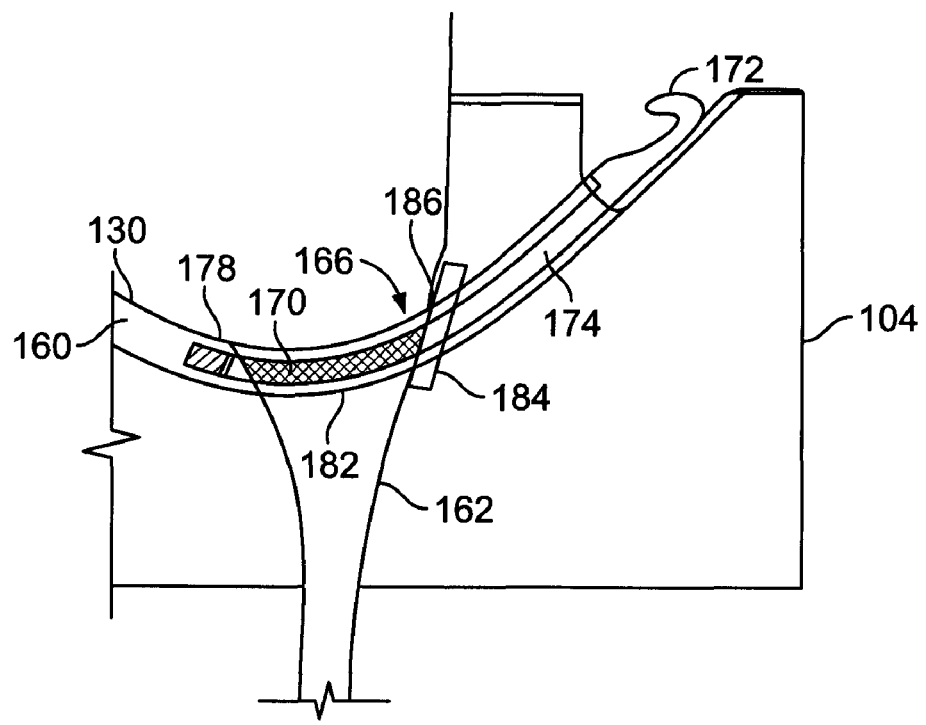
FIG. 3 is a fragmentary cross section taken along line A-A of FIG. 2 with the cabinet installed.

FIG. 3 illustrates a cross sectional view of machine 100 taken through filter assembly 166. Filter assembly 166 includes a mesh filter element 170, a handle 172 and a portion 174 joining handle 172 to mesh filter element 170. Filter element 170 is slidably coupled within filter channels channel 178 formed in drain channel 160. More specifically, filter element 170 extends into drain channel 160 and across an inlet 182 of outlet tube 162. Handle 172 enables a user to remove and reinstall filter assembly 166 for cleaning. A seal 184 substantially seals an entry 186 of drain channel 160 into which filter assembly 166 is received. Because the dry cleaning machine 100 is sealed during operation, handle 172 is accessible only when machine door 112 (shown in FIG. 1) is open. In alternative embodiments, dry cleaning machine 100 may be provided with an interlock system that senses the presence of filter assembly 166 such that dry cleaning machine 100 is operable only when filter assembly 166 is present.

Filter element 170 is exposed to drying gasses during the drying cycle such that filter element 170 and any captured particulates are also dried during the drying cycle. As such, filter element 170 can be removed for cleaning without the user contacting and residual dry cleaning fluid. Alternatively, dry cleaning machine 100 can be provided with a cleaning system wherein filter element 170 is reverse flushed with water such that lint and other trapped particulates are flushed through a drain. In such an embodiment, filter element 170 may be a part of a sealed system that does not require user access.

Figure 4:
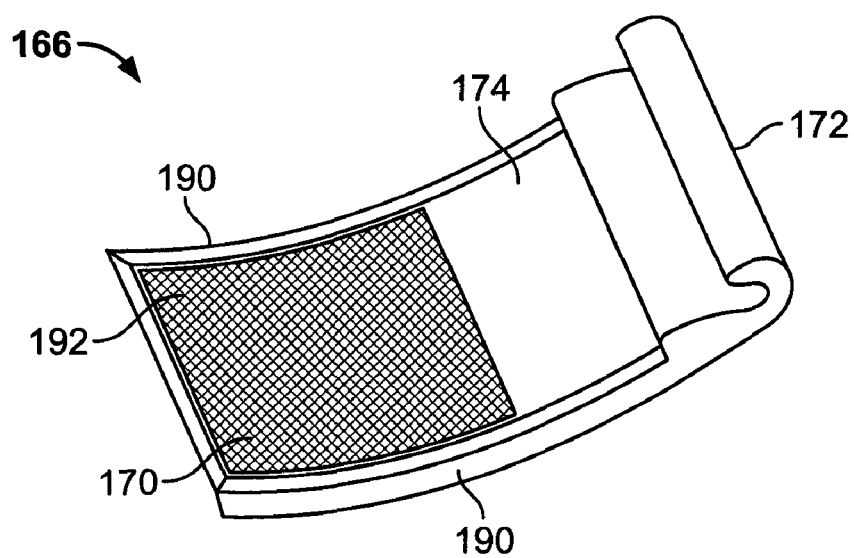
FIG. 4 is a perspective view of an exemplary filter.

FIG. 4 illustrates an exemplary filter assembly 166. Filter assembly 166 includes filter element 170, handle 172, and connecting portion 174. Filter element 170 is selectively sized such that only particles of a pre-determined size are captured without adversely impacting drainage from tub 130. Filter element 170 is retained in a framework that includes connecting portion 174, side rails 190, and an end rail 192. Side rails 190 are received in channels 178, formed in drain channel 160. In the exemplary embodiment, side rails 190 and end rail 192 are formed from a material that is sufficiently flexible to accommodate a curvature in tub 130.

In use, filter assembly 166 is slidably received in channels 178 in drain channel 160. Seal 184 seals entry 186 into which filter assembly 166 is received. When door 112 is closed, dry cleaning machine 100 may be operated. Filter assembly 166 is rendered inaccessible when door 112 is closed. After the cleaning cycle is complete, dry cleaning fluid is drained from tub 130 through filter assembly 166. The filtration through filter assembly 166 is the first stage in filtering the dry cleaning fluid for reuse. The dry cleaning fluid filtered through filter assembly 166 enters outlet tube 162 and is conveyed to canister filter 152 which is part of the fluid filtration system of dry cleaning machine 100.

After draining the liquid dry cleaning fluid, the clothes are tumbled in a drum (not shown) while air is passed over the clothes. Air from the drum and tub 130 is also passed over filter element 170 so that filter element is dried as the clothes are dried. At the conclusion of the drying cycle, dry cleaning machine 100 stops and filter assembly 166 may be removed and filter element 170 may be cleaned.

The above-described apparatus provides a filter assembly 166 that includes a filter element 170 that is designed to catch and retain larger particulates without impacting the drain time from tub 130. Filter assembly 166 may be removed for cleaning of filter element 170. The filter assembly 166 is easily accessible from the front of the dry cleaning machine 100 for cleaning.

While the invention has been described in terms of various specific embodiments, those skilled in the art will recognize that the invention can be practiced with modification within the spirit and scope of the claims.

What is claimed is:

1. A dry cleaning machine comprising:
 a tub for holding articles to be cleaned;
 a door rotatably coupled to said dry cleaning machine, said door movable from a closed position, wherein access to said tub is substantially sealed, to an open position providing access to said tub;
 an outlet tube coupled in flow communication with said tub;
 a storage tank in flow communication with said tub;
 a seal configured to facilitate preventing dry cleaning fluid from exiting said dry cleaning machine;
 a filter assembly comprising a handle and a filter element coupled to said handle, said filter assembly slidably positioned between said tub and said outlet tube to facilitate filtering dry cleaning fluid channeled towards said outlet tube, said filter assembly positionable such that said seal is disposed between said handle and said filter element; and
 a pump positioned in flow communication between said storage tank and said filter assembly, said pump configured to channel filtered dry cleaning fluid to said storage tank such that the filtered dry cleaning fluid is reusable for a plurality of washing cycles.

2. A dry cleaning machine in accordance with claim 1 further comprising a canister filter, wherein said filter assembly comprises a first stage of filtration for the dry cleaning fluid and said canister filter comprises a second stage of filtration for the dry cleaning fluid.

3. A dry cleaning machine in accordance with claim 1 wherein said tub comprises a drain channel coupled in flow communication with said outlet tube, said filter assembly removably positioned within said drain channel.

4. A dry cleaning machine in accordance with claim 3, wherein said seal is disposed at an entry of said drain channel, said seal configured to facilitate preventing the dry cleaning fluid from exiting said dry cleaning machine adjacent to a handle of said filter assembly.

5. A dry cleaning machine in accordance with claim 3 wherein said drain channel comprises a filter channel configured to slidably receive said filter assembly.

6. A dry cleaning machine in accordance with claim 5 wherein said filter assembly comprises a plurality of side rails received in said filter channel.

7. A dry cleaning machine in accordance with claim 6 wherein said plurality of side rails are flexible to accommodate a curvature in said tub.

8. A dry cleaning machine in accordance with claim 1 wherein said filter assembly is inaccessible when said door is in the closed position.

9. A dry cleaning machine in accordance with claim 1 wherein said filter assembly comprises a filter element that is dried during a drying cycle of the dry cleaning machine.

10. A dry cleaning machine in accordance with claim 1 further comprising a sensor for sensing a presence of said filter assembly.

11. A dry cleaning solvent filter system for a dry cleaning machine, said filter system comprising:
a filter assembly comprising:
a handle;
a filter element coupled to said handle;
a plurality of rails enclosing said filter element, said plurality of rails flexible to accommodate a curvature in a tub of the dry cleaning machine; and
a connecting portion coupled to said handle and said plurality of rails and configured to join said handle and said filter element;
a seal disposed between said handle and said filter element;
a storage tank configured to contain filtered dry cleaning fluid; and
a pump positioned in flow communication between said storage tank and said filter assembly, said pump configured to channel filtered dry cleaning fluid to said storage tank such that the filtered dry cleaning fluid is reusable for a plurality of washing cycles.

12. A filter system in accordance with claim 11 wherein said plurality of rails comprises opposing side rails and an end rail enclosing said filter element.

13. A filter system in accordance with claim 12 wherein said side rails, said end rail and said connecting portion form a framework for said filter element.

14. A filter system in accordance with claim 11 wherein said plurality of rails are configured to be received in a filter channel defined within the dry cleaning machine.

15. A filter system in accordance with claim 11 further comprising a seal coupled between said connecting portion and said filter element, said seal configured to seal an entry of a channel in which said filter assembly is received.

16. A filter system in accordance with claim 11 further comprising a canister filter in flow communication with said filter assembly and said storage tank.

17. A filter system in accordance with claim 11 further comprising a water separator in flow communication with said filter assembly and said storage tank, said water separator configured to remove water from the filtered dry cleaning fluid.

18. A filter system in accordance with claim 11 further comprising a fluid recovery system coupled above the tub of the dry cleaning machine, said fluid recovery system configured to recover evaporated dry cleaning fluid during a drying cycle and channel recovered dry cleaning fluid to said storage tank.

* * * * *